Oct. 1, 1968   H. SCHRODER   3,403,640
DOUGH DIVIDING OR BATCHING MACHINE
Filed June 3, 1965   6 Sheets-Sheet 1
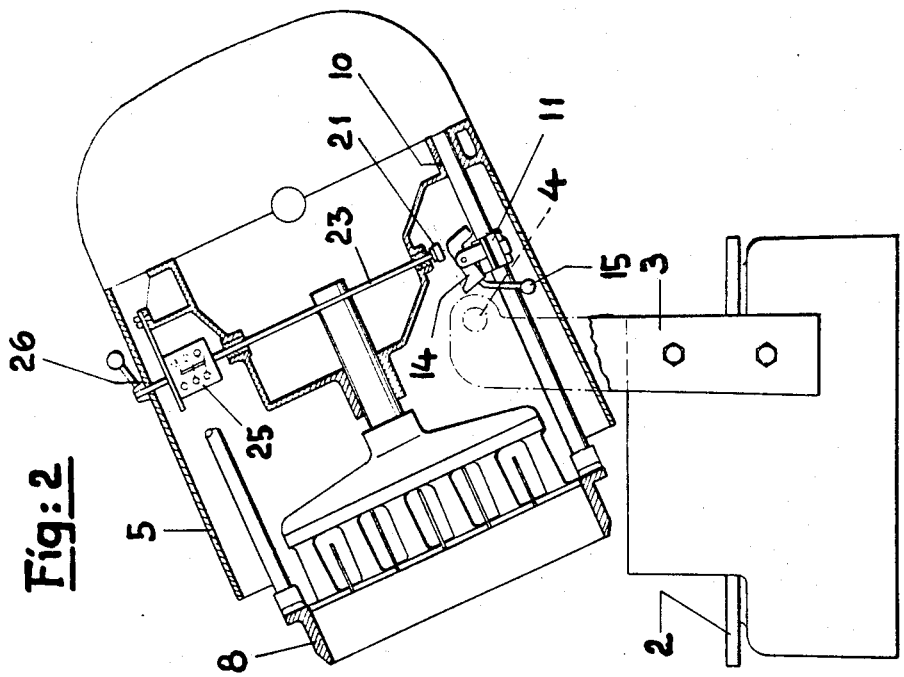
Fig:2
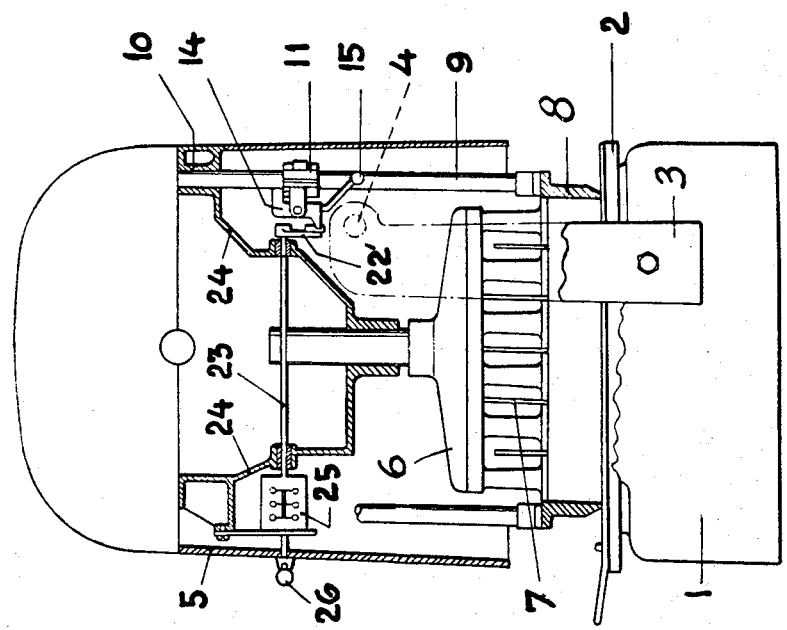
Fig:1

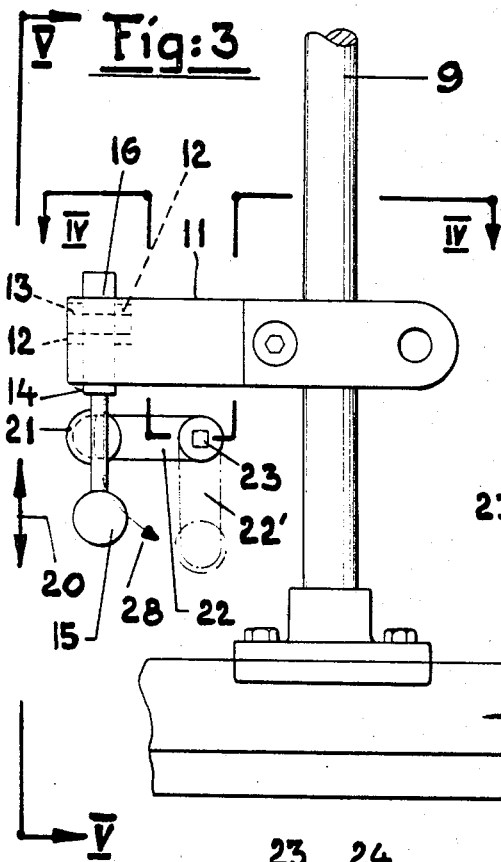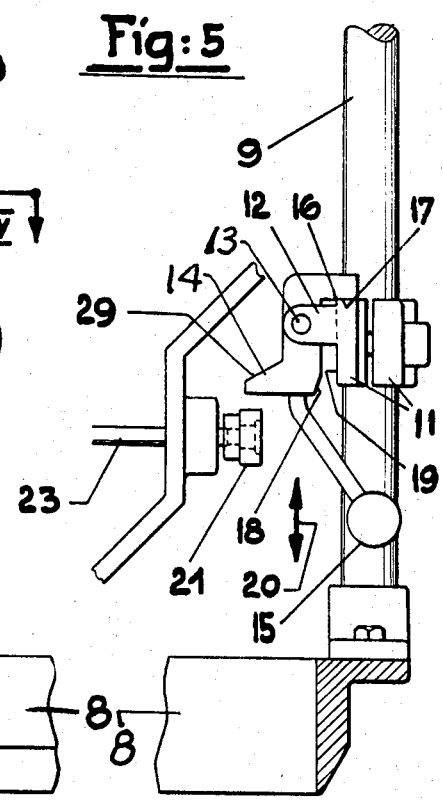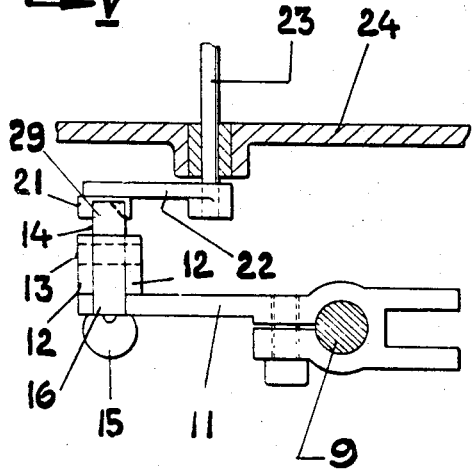

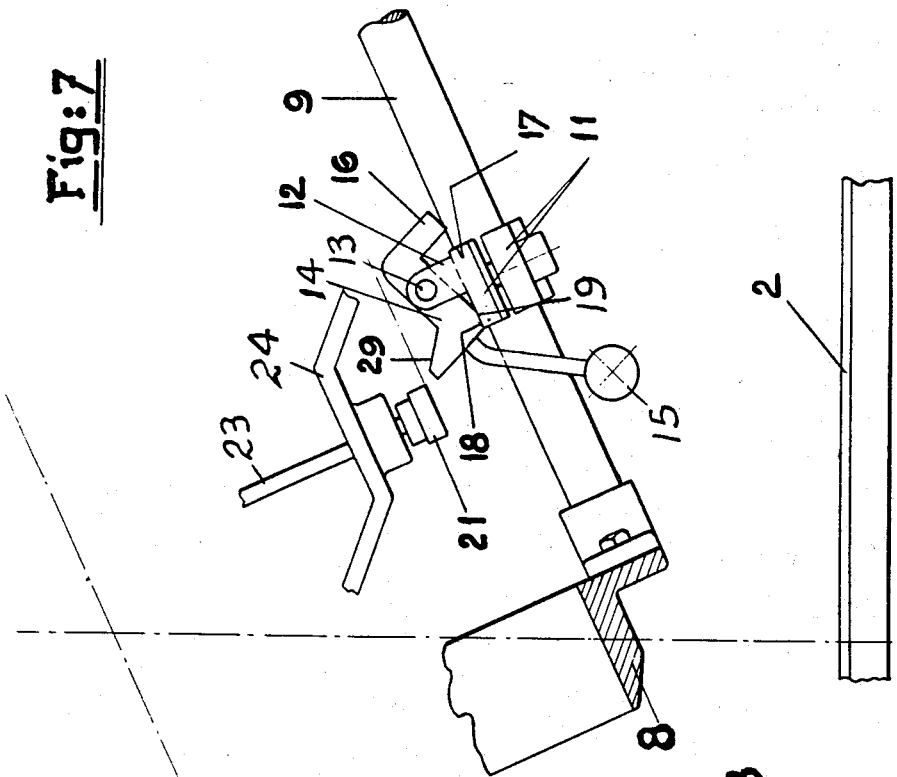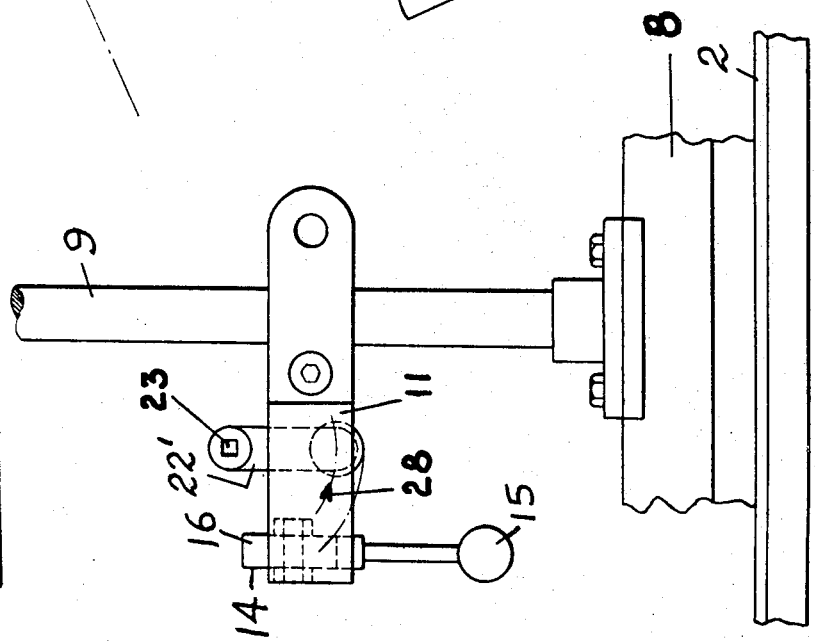

Oct. 1, 1968 H. SCHRODER 3,403,640
DOUGH DIVIDING OR BATCHING MACHINE
Filed June 3, 1965 6 Sheets-Sheet 4
Fig:8
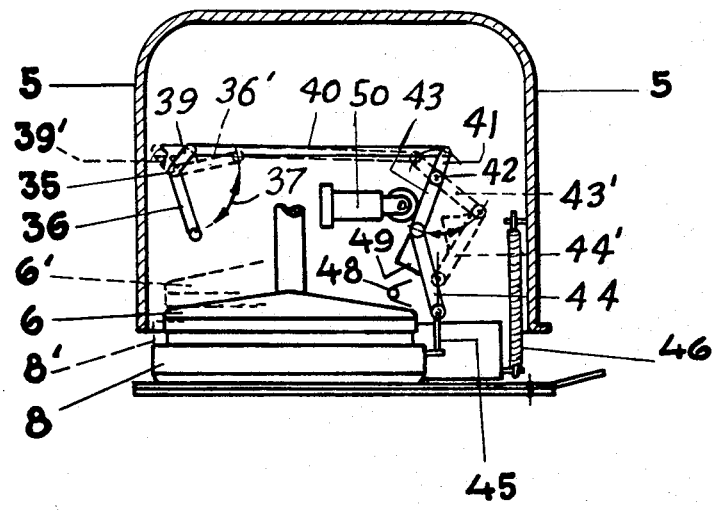

Oct. 1, 1968    H. SCHRODER    3,403,640
DOUGH DIVIDING OR BATCHING MACHINE
Filed June 3, 1965    6 Sheets-Sheet 5
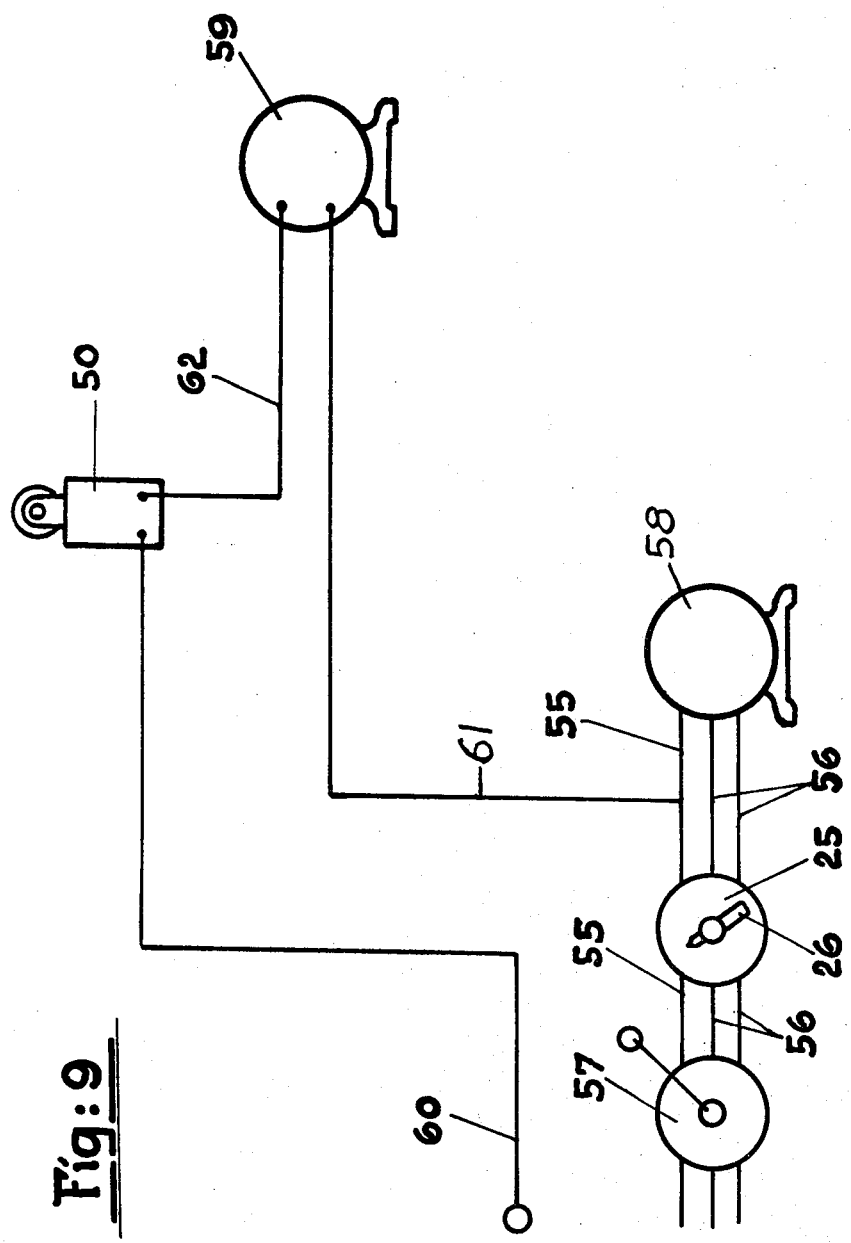
Fig: 9

Oct. 1, 1968                H. SCHRODER                3,403,640
                    DOUGH DIVIDING OR BATCHING MACHINE
Filed June 3, 1965                                6 Sheets-Sheet 6

INVENTOR
HERBERT SCHRODER
BY
ATTORNEYS

United States Patent Office 3,403,640
Patented Oct. 1, 1968

3,403,640
DOUGH DIVIDING OR BATCHING MACHINE
Herbert Schroder, Angerstrasse, Staffelstein,
Upper Franconia, Germany
Filed June 3, 1965, Ser. No. 461,118
Claims priority, application Germany, June 22, 1964,
Sch 335,358
13 Claims. (Cl. 107—68)

ABSTRACT OF THE DISCLOSURE

A dough dividing or batching machine in which a bracket or carrier tiltable relative to a dough support is provided with suitable tools including a dough enveloping ring. The tools are adapted to be operated by a driving system. The dough enveloping ring is lowered to the dough support by a manual lever having associated therewith a switching cam entrained by the ring and displaceable thereby axially of the ring into at least two positions relative to a switching means of a switching device incorporated in the driving system. When the switching cam is lowered by the ring into one of its positions relative to the switching means it functions in an activating manner while in its other position, it extends beside the switching means.

---

Figure 10:
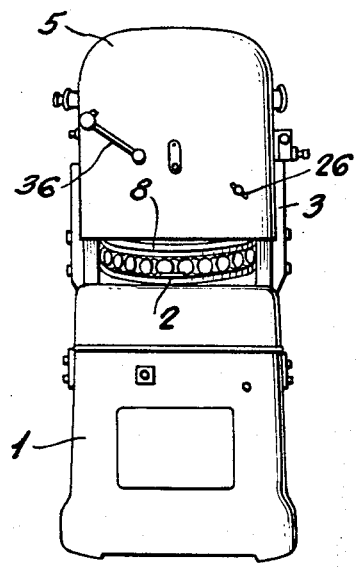

The present invention relates to a dough dividing or batching machine comprising a bracket or the like arranged to be tiltable relative to a dough supporting plate of a machine frame, the bracket comprising tools such as a cutter head, blade assembly and so-called dough enveloping ring, which are actuated by means of a driving system.

Dough dividing or batching machines of this kind, which may be constructed in a variety of ways, are made to operate by causing the clutch of a transmission system to be engaged or an electric motor to be activated in order to drive the tools, and to be disengaged or deactivated as the case may be, after completion of one or a series of operating sequences. A dough dividing and batching and kneading machine is known, in which the dough enveloping ring may be lowered at the beginning of operation, independently of the other tools, thereby causing the machine to operate by the action of a switching arrangement which cannot be varied during operation.

The object of the present invention is to design the device in such manner that after the machine has been activated by the lowering of the dough enveloping ring, it may be deactivated at any time by means of the switching device, and that an action of the dough enveloping ring on the switching device may be nullified at desired points.

To this end, the invention is directed to the concept that the dough enveloping ring which may be lowered on to the dough supporting plate by means of a manual lever, has co-ordinated therewith a switching cam which is entrained in the axial direction of the dough enveloping ring and is displaceable relative to a switching member into at least two positions, which when displaced into one of its positions by the lowering of the dough enveloping ring acts in the activating sense on the switching member of a switching system provided for the drive of the tools, and in its other position extends beside the switching member. By virtue of the fact that the switching cam arranged to be lowered with the dough enveloping ring may be positioned in two settings, the activating action being possible at one setting and barred at the other, it is accomplished that the machine can be activated only if the switching cam is situated in the appropriate position when the dough enveloping ring is lowered. The inoperative setting of the switching cam may be adjusted during the cleaning of the machine for example.

As set forth above, it is known per se to equip a dough batching or dividing and kneading machine with a cycle activation and deactivation device, which, for the purpose of initiation of a working cycle, incorporates a manual lowering system for the dough enveloping ring or for a safety screen or skirt, and comprises a switching device for the driving motor, the action of activating the machine occurring only after full lowering and subsequent slight raising of the dough enveloping ring or of the safety skirt. It is a disadvantage of this system that the machine cannot be deactivated during the working sequence, and that the machine may be activated accidentally by this device when the tiltable bracket or the like is being tilted backwards. If a contact breaker is incorporated, which is operative while the bracket is tilted, in order to eliminate this shortcoming, the machine cannot be activated at all after the bracket has been tilted, which represents a disadvantage in performing cleaning operations on the tools. This disadvantage is eliminated by virtue of the fact that the switching member is followed in manner known per se by a so-called cycle control switch, which is interpolated in the circuit of the motor operating the tools, and serves for closing the circuit when the dough enveloping ring or a safety skirt is being lowered, and opening the circuit when the dough enveloping ring or the safety skirt is being raised.

The known devices specified hereinbefore was disclosed in the German patent specifications 1,007,264, 1,024,032, 1,024,454 and 1,039,002, and in the patent applications Sch 24,078 III/2b and Sch 31,213 III/2b filed in Germany by the same applicants.

Further objects and advantages of the invention will become more readily apparent from the following detailed description and accompanying drawings, in which:

FIGURE 1 illustrates a partially sectioned side elevation of a dough batching or dividing and kneading machine, principally depicting the parts corresponding to the present invention, FIGURE 2 illustrates a partially sectioned side elevation similar to FIGURE 1, showing a bracket or carrier of the machine in another position, FIGURE 3 illustrates an enlarged scale side elevation of a part of the machine, FIGURE 4 illustrates a section taken along IV—IV of FIGURE 3, FIGURE 5 illustrates a view taken along line V—V of FIGURE 3, FIGURE 6 illustrates a view similar to FIGURE 3, but in a different position, FIGURE 7 illustrates a view similar to FIGURE 5, but in a different position reached by tilting the bracket or carrier, FIGURE 8 shows a simplified form of illustration of a bracket or carrier of different construction, in section, comprising a known raising and lowering mechanism for a dough enveloping ring, and a so-called cycle control switch, FIGURE 9 illustrates a simplified wiring diagram for the driving system of the machine according to FIGURES 1 to 8, and FIGURES 10 to 12 show different views of the machine according to the invention, in different positions of the bracket or carrier and tools.

As apparent from FIGURES 1 and 2, a machine frame 1 equipped with a dough support plate 2 which performs kneading or working displacements in manner known per se, carries arms or posts 3, and a bracket or carrier 5 is tiltably mounted therein by fulcrum pins 4. The carrier 5 may be arranged to tilt and lock in manner known per se.

The tools situated within the carrier 5 consist of a press head 6, a cutter assembly 7 and a dough enveloping ring 8, which are driven in manner known per se by means of an electric motor (not illustrated). The dough enveloping ring has guide rods 9, each of which is guided in a bearing 10 of the carrier 5.

As apparent from FIGURES 3 to 7, an arm or bracket 11 is clamped on the guide rod 9, the arm or bracket 11 being displaceable in the axial direction of the rod. The bracket 11 carries bearing blocks 12 mounting a fulcrum pin 13 on which a switching cam or trip 14 is pivotally mounted. The switching cam 14 is equipped with an appropriately positioned weight 15 and an abutment 16, which latter co-operates with a counter-abutment 17 of the bracket 11 in the position shown in FIGURES 3 to 6, whereas in another position shown in FIGURE 7, a limiting abutment 18 of the switching cam 14 co-operates with a limiting counter-abutment 19 of the bracket 11.

In the path of travel of the switching cam 14 produced by an upward and downward displacement of the dough enveloping ring 8 with its guide rod 9 in the direction of the arrow 20, is situated a roller 21 of a switching lever 22 representing a switching member, provided that the switching lever 22 is situated in the horizontal position illustrated. A spindle 23 carrying the switching lever 22 is swivellably mounted in supports 24 of the carrier 5, and its free extremity terminates in a switch 25 which may complementarily be operated from the outside by means of a switching lever 26. The position of the switching cam 14 is such that during the downward displacement of the dough enveloping ring 8, it turns the horizontally positioned switching lever 22 in the direction of the arrow 28, a spring (not illustrated) moving the switching lever 22 into a vertical position 22' shown in FIGURE 6, turning the spindle 23 and causing the switch 25 to be activated. By virtue of a sloping surface 29 provided on the switching cam 14 as shown in FIGURE 7, the return motion, that is to say upward displacement of the dough enveloping ring 8 does not cause the switching cam 14 to act on the switching lever 22, since the surface 29 of the switching cam 14 slides along the switching lever 22 when the latter is in the horizontal position, turning the cam.

When the carrier 5 has been tilted into the position according to FIGURES 2 and 7, the switching cam 14 has been moved to the position shown therein by the action of the weight 15 mounted appropriately below the pivot pin 13, so that the switching cam 14 runs past the switching lever 22 during the reciprocating motion of the dough enveloping ring 8, without striking this lever, that is to say without displacing said lever into the position shown at 22'.

In lieu of the weight 15, the cam 14 can be pivoted to a rod which in the position shown in FIGURE 1 rests loosely on a spring supported by an abutment on the frame 1. As apparent from FIGURE 2, the switching cam 14 is turned out of its operative position when the carrier 5 is tilted, whereas it is situated in its operative position in the position shown in FIGURE 1. The other displacements described above can also be performed by the switching cam 14.

The mode of operation employed is the following: The switch 25 is deactivated and the machine inoperative, when the carrier is in the position shown in FIGURE 1, the dough enveloping ring in its upper position, and the switching lever 22 in its horizontal position. When the dough enveloping ring 8 is lowered to the position according to FIGURE 1 by means of a hand lever for example, the switching cam 14 acts on the roller 21 to place the lever 22 in the position 22', the switch 25 being activated through the spindle 23. The tools of the machine may now operate in the manner described below, by virtue of the drive made operative by said switching action.

The switch 25 activates either an electric motor or a coupling between a continuously running motor and the tools. By means of the switch 25, the coupling is so actuated that the motor and tools are connected and then so manipulated that it does not connect the motor and the tools.

If the carrier 5 in the position according to FIGURE 2, the switching cam 14 has been turned in such manner by the weight 15 that it does not strike the roller 21 of the switching lever 22 when the dough enveloping ring 8 is lowered, so that the switch 25 remains deactivated.

A manual lever 36 which may also be employed in the combination of the system above with the known system shown in FIGURE 8, serves for moving the dough enveloping ring 8. A spindle 35 which is rotatably mounted in the carrier 5, has fastened thereto the manual lever 36 which may be displaced in direction of dash line arrow 37 as far as the position 36' and back from the same. The spindle 35 has fastened thereto a lever 39 on which is articulated a connecting link 40, and the latter is articulated on an arm 41 of a two-armed lever 43 mounted at 42. On the free extremity of a second arm of the lever 43 there is articulated another connecitng link 44 whose other extremity is articulated on a projection 45 secured on the dough enveloping ring 8. The dough enveloping ring 8 is acted upon moreover by a spring 46 suspended on the carrier 5, which tends to draw the dough enveloping ring upwards. A cycle control switch 50 which is fastened on the carrier 5, lies in the path of travel of the lever 43. As stated above, this device is known and may be replaced by another appropriate device.

The mode of operation applied is the following: The manual lever is in the position 36' when the machine is deactivated. The lever and connecting link are in the dash line positions 43' and 44', the dough enveloping ring in the upper dash line position 8' and the press head in the upper dash line position 6'. When the lever is moved from the dash line position 36' to the position 36, causing the interaction of the switching cam 14 and switching lever 22 as described above, the lever and connecting link pass from the dash line positions 43' and 44' to the positions 43 and 44, thereby causing the cycle control switch 50 to be activated as shown in FIGURE 8, and the spring 48 extended. By activating the cycle control switch 50, a driving motor 59 is started which drives the tools of the machine. The operation of the machine now initiated causes the press head to move from the dash line position 6' to the position 6, and a working cycle occurs in known manner. When the press head 6 again reaches the dash line position 6' at the end of the working cycle, the spring 48 acts on the projection 49 and presses the lever and connecting link 43 and 44 into the dash line positions 43' and 44', thereby causing the cycle control switch 50 to be deactivated, so that the machine stops. Another working cycle begins after the actuation of the manual lever 36 which has returned to the position 36', but the switch 25 is no longer acted upon in the manner specified above, but remains in the operative position. The switching lever 26 is moved manually into the "off" position after all working operations have been concluded. The machine is ready for cleaning or to begin work again.

FIGURE 9 illustrates a simplified wiring diagram for the machine last described. Conductors 55 and 56 have interpolated therein a main switch 57 followed by a drive system switch 25, which is followed by the driving motor 59 for the tools, and by a kneading motor 58 where appropriate, and a neutral wire is identified by reference numeral 60. A conductor 61 branching off from the conductor 55 behind the drive system switch 25 leads to the driving motor 59. The cycle control switch 50 is interpolated in a conductor 62 of the driving motor 59 leading to the neutral wire 60. When the switching cam 14 places the switching lever 22 in the position 22', the drive system switch 25 is activated so that the kneading motor 58 is made to run, and the circuit of the driving motor 59 is placed in readiness. When the lowering of the dough enveloping ring 8 causes the cycle control switch 50 to be activated by means of the device according to FIGURE 8, the driving motor 59 is also made to operate, so that a working cycle of the machine is performed. When the cycle control switch 50 is deactivated automatically in the known manner described above, without acting upon the drive system switch 25, only the driving motor 59 is deactivated, whereas the kneading motor 58 continues to run, as known.

Omitting the cycle control switch 50 from the system according to FIGURE 8, but incorporating the hand lever 36 for raising and lowering the dough enveloping ring 8, the drive system switch 25 renders it possible to allow the machine to perform a multiplicity of working actions, until the switching lever 26 is placed in the "off" position. In a system of this nature, the working cycle must be controlled in such manner as to allow time for removal of the kneaded loaves or the like, and for insertion of a fresh lump of dough.

Figure 11:
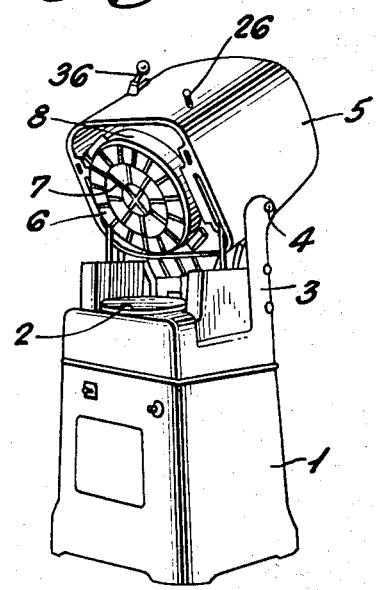
Figure 12:
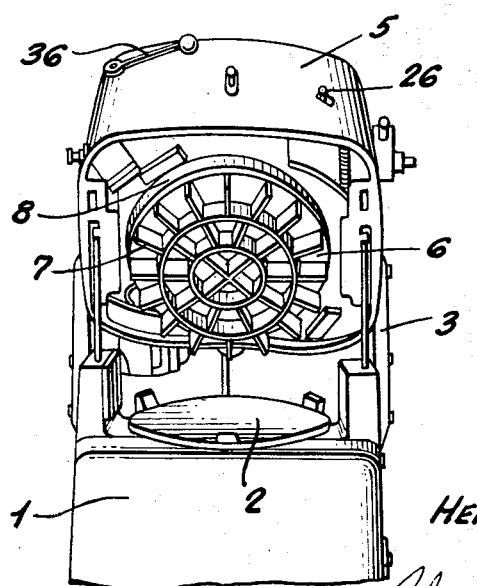

FIGURES 10 to 12 illustrate some working positions of the machine.

FIGURE 10 shows the machine after completion of a working cycle with the kneaded loaves or the like in readiness for removal and if necessary for replacement by a fresh lump of dough. FIGURE 11 shows the machine with the carrier in the tilted position. The press head 6 has the cutter assembly 7 retracted, and may be cleaned. According to FIGURE 2, the dough enveloping ring 8 has been lowered so that it may be cleaned. Due to the system described above however, the driving motor 59 of the tools is not activated. FIGURE 12 shows the machine with the cutter assembly 7 extended during cleaning, with the actuation of the switching lever 26 having caused the drive system switch 25 to energize the driving motor 59 in order to extend the cutter assembly. The dough enveloping ring 8 may be moved back and forth for cleaning purposes without affecting the machine, and reference is made to the operation of the switching cam 14. FIGURE 2 illustrates the manner in which the rear portion of the press head 6 may be cleaned by means of a brush. The machine may be returned to the initial position by actuating the switching lever 26. The main switch 57 is then activated, but is turned off on completion of the work. The switch 57 may be so arranged as to feed the conductor 55 but not to close the circuit of the kneading motor 58 in one position.

The drive system switch 25 and the driving motor 59 are appropriately mounted in the carrier, and the kneading motor 58 on the machine frame.

The drive system switch 25 may advantageously be turned on and off in any positions and settings of the machine. This is of special importance in a case in which a multiplicity of power plugs is available in a bakery, and the plugs are not however interconnected in phase coincidence. If the plug is inserted into a different socket, rather than into that for which it is set up, it may be possible for the machine to run backwards and to jam. In a case of this kind, the drive system switch 25 may be deactivated immediately by means of the switching lever 26. On tilting the carrier, the automatic sequence described above and performing a working cycle remains in operation only while the drive system switch 25 remains activated by the switching lever 26, and while the dough enveloping ring 8 remains lowered or until the latter has reached its upper terminal position. With the carrier tilted, the mechanism of the machine may be activated at any time by means of the drive system switch 25 after the dough enveloping ring 8 has been lowered.

The machine need not necessarily be equipped with a kneading mechanism.

I claim:

1. A dough dividing or batching machine comprising a bracket or carrier arranged to be tiltable relative to a dough support plate of a machine frame, said bracket or carrier being equipped with tools such as a cutter assembly, a cutter head and a dough enveloping ring, these tools being operated by means of a driving system, characterized in that said dough enveloping ring which is arranged for lowering on to the dough support plate by means of a manual lever has associated with it a switching cam or trip cam entrained by said ring and arranged to be displaceable thereby in the axial direction of said dough enveloping ring into at least two positions with respect to a switching member, this switching cam acting in the activating sense when lowered by the dough enveloping ring into one of its positions on the switching member of a switching device incorporated in the driving system of said tools, and said switching cam extending beside this switching member in its other position.

2. A machine according to claim 1, characterized in that the switching cam is displaceable during the tilting of said bracket or carrier as a function of the tilting motion.

3. A machine according to claim 1, characterized in that the switching cam may be swivelled about a fulcrum pin extending approximately parallel to the pivot axis of said bracket or carrier.

4. A machine according to claim 3, characterized in that the switching cam is equipped with a weight mounted with spacing from its fulcrum pin, in such manner that the action of this weight causes the switching cam to be turned into its actuating position with respect to the switching member when the bracket or carrier is in the operative position, and to be turned out of its operative position with respect to the switching member when the said bracket or carrier is being or has been tilted.

5. A machine according to claim 3, characterized in that the switching cam has provided thereon an upper surface extending obliquely with respect to its path of travel, in such manner that upward displacement of the dough enveloping ring causes the oblique surface of the switching cam to encounter the switching member, thereby causing the former to slide past the latter without actuating the same.

6. A machine according to claim 3, characterized in that the switching cam has an abutment which co-operates with a counter-abutment joined to the dough enveloping ring in the operative position of the bracket or carrier, and in that the switching cam may be equipped with a limiting abutment which in the tilted position of the bracket or carrier co-operates with a limiting counter-abutment joined to the dough enveloping ring.

7. A machine according to claim 3 characterized in that the fulcrum pin of the switching cam is mounted in bearings of a bracket which is mounted on a guide rod of the dough enveloping ring so as to be displaceable in the axial direction of the guide rod.

8. A machine according to claim 1, characterized in that the switching member is a pivotable switching lever whose spindle terminates in the switching device and which is laterally spaced apart from the path of travel of the switching cam, the pivotable switching lever extending horizontally in the inoperative position of the switching device and its extremity being positioned in the path of travel of the switching cam, whereas it may be situated in a vertical position outside the path of travel of the switching cam when the switching device is in the operative position.

9. A machine according to claim 1, characterized in that the switching device arranged to form a drive system switch is equipped with a hand lever mounted on said bracket or carrier for manual actuation of said drive system switch.

10. A machine according to claim 1, characterized in that the drive system switch is interpolated in the circuit of a driving motor for said tools.

11. A machine according to claim 10, characterized in that the driving motor for said tools may equally drive a kneading mechanism in manner known per se.

12. A machine according to claim 10, characterized in that a separate motor is incorporated for the kneading mechanism independently of said driving motor for said tools.

13. A machine according to claim 12, characterized in that said drive system switch is followed in manner known per se by a cycle control device in the circuit of the driving motor for said tools, this cycle control device serving the purpose of closing said circuit when the dough enveloping ring or a safety screen or skirt is lowered, and of opening said circuit when said ring or said skirt is raised.

References Cited

UNITED STATES PATENTS 2,351,841   6/1944   Seem _____ 107—68

WALTER A. SCHEEL, *Primary Examiner.*

J. SHEA, *Assistant Examiner.*